United States Patent Office 3,772,326
Patented Nov. 13, 1973

3,772,326
DIGLYCIDYL COMPOUNDS OF MONOHY-
DROXYALKYL HYDANTOINS
Hans Batzer, Arlesheim, Juergen Habermeier, Pfeffingen,
and Daniel Porret, Binningen, Switzerland, assignors
to Ciba-Geigy AG
No Drawing. Continuation-in-part of application Ser. No.
870,547, Nov. 4, 1969, now Patent No. 3,629,263. This
application Dec. 20, 1971, Ser. No. 210,211
Claims priority, application Switzerland, Nov. 11, 1968,
16,803
The portion of the term of the patent subsequent to
Dec. 21, 1988, has been disclaimed
Int. Cl. C07d 49/32
U.S. Cl. 260—309.5                    3 Claims

ABSTRACT OF THE DISCLOSURE

New compounds, namely 1-glycidyl-3-(2'-glycidyloxy-ethyl)-5,5-dimethylhydantoin and 1-glycidyl-3-(2'-glyc-cidyloxy-n-propyl)-5,5-dimethylhydantoin, which are especially distinguished in that the mouldings obtained therefrom by curing, and in particular by anhydride curing, possess considerably high heat distortion points according to Martens (DIN 53,458).

CROSS REFERENCE TO RELATED APPLICATION

This is a continuation in part of our copending application Ser. No. 870,547, filed Nov. 4, 1969 and now U.S. Pat. 3,629,263.

This invention relates to compounds of formula

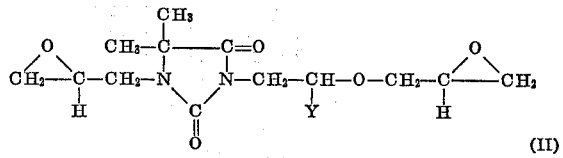

(II)

wherein Y in each case denotes a hydrogen atom or a methyl group. They are manufactured according to the invention in that monoalcohols of formula

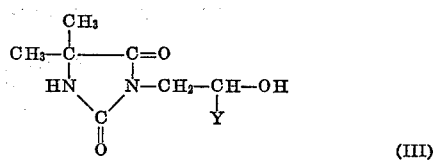

(III)

wherein Y has the same meaning as in Formula II, are reacted in a single stage or several stages with an epihalogenohydrin, preferably epichlorohydrin, in a manner which is in itself known.

In the single-stage process, the reaction of epihalogenohydrin with a compound of Formula III takes place in the presence of alkali, with sodium or potassium hydroxide being used preferably. In the two stage process which is preferably used, the compound of Formula III is condensed, in a first stage, with an epihalogenohydrin in the presence of acid or basic catalysts, such as preferably tetraethylammonium chloride, to give the halogenohydrin compound, and thereafter the latter is dehydrohalogenated in a second stage by means of alkalis, such as potassium hydroxide or sodium hydroxide, to give the glycidyl ether.

The diglycidyl compounds according to the invention, of Formula II, react with the usual curing agents for polyepoxide compounds and can therefore be crosslinked or cured by the addition of such curing agents, analogously to other polyfunctional epoxide compounds or epoxide resins respectively. Possible curing agents of this type are especially polycarboxylic acid anhydrides, such as for example hexahydrophthalic anhydride or phthalic anhydride, and also polyamines, such as for example triethylenetetramine or 3,5,5-trimethyl-3-(aminomethyl)cyclohexylamine.

The curable epoxide resin mixtures are above all employed in the fileds of surface protection, electrical engineering laminating processes and the building trade.

In the examples which follow, unless otherwise stated, parts denote parts by weight and percentages denote percentages by weight. The relationship of parts by volume to parts by weight is as of the millilitre to the gram.

To determine the mechanical and electrical properties of the curable mixtures described in the examples, which follow, sheets of size 92 x 41 x 12 mm. were prepared for determination of flexural strength, deflection, impact strength and water absorption. The specimens (60 x 10 x 4 mm.) for the determination of the water absorption and for the flexural and impact test (VSM 77, 103 and VSM 77, 105 respectively) were machined from the sheets.

Test specimens of sizes 120 x 15 x 10 mm. were in each case cast for determining the heat distortion point according to Martens (DIN 53,458).

Sheets of dimensions 120 x 120 x 4 mm. were cast for testing the arcing resistance and tracking resistance (VDE 0303).

MANUFACTURE OF THE STARTING SUBSTANCES

Example A.—3-(2'-hydroxy-n-propyl)-
5,5-dimethylhydantoin (1) A solution of 896 g. of 5,5-dimethylhydantoin (7 mols) and 5.92 g. of lithium chloride in 900 ml. of dimethylformamide is stirred at 50° C. 458 g. of propene oxide (7.7 mols) are added dropwise over the course of one hour, with slight stirring. After the dropwise addition, the mixture is stirred for 3 hours at 55° C. The heating bath is then brought to 100° C. The reaction is slightly exothermic and the contents of the flask rise to 112° C. After one hour, the exothermic effect has subsided and the reaction is thus complete. The solution is filtered. After it has cooled to room temperature, the batch is adjusted to pH=7 with about 15 ml. of 20% strength sulphuric acid. The dimethylformamide is recovered by distilling off under a waterpump vacuum, and the product is subsequently isolated by drying at 95° C. under 0.1 mm. Hg. 1305 g. of an eggshell-coloured mass of crystals (100% of theory) are obtained. The product can be purified by recrystallisation from acetone. A colourless, crystalline product of melting point 83–84.5° C. is obtained, the pure yield being about 80%.

Elementary analysis shows (percent): Found: 14.93, N; 7.59, H. Calculated: 15.04, N; 7.58, H.

The molecular weight is determined as M=186 by osmometry. The mass spectrum also shows M=186. The theoretical molecular weight is 186.21.

The infra-red spectrum shows, in addition to the absorptions known for dimethylhydantoin, above all the following bands: 3495 cm.$^{-1}$ (S): O—H, 3250 cm.$^{-1}$ (S): N—H.

The proton resonance spectrum (60 mc H—NMR, recorded in CDCl$_3$ at 35° C. with tetramethylsilane as the internal standard) furthermore shows, through the presence of the following signals, that the structure given below is correct for the new compound:

3 protons=1.17 and 1.17 and 1.28 (doublet):

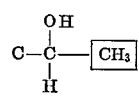

6 protons=1.50 (singlet):

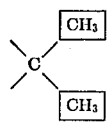

4 protons=3.55 and 3.65 (doublet):

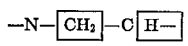

and =4.0–4.2 (multiplet):

1 proton=7.15

Theoretical number of protons: 14
Accordingly, the structure is:

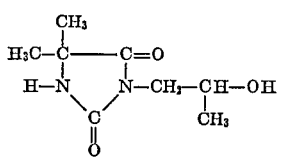

(2) A mixture of 256 g. of 5,5-dimethylhydantoin, 159 g. of potassium carbonate, 208 g. of 1-chloro-2-hydroxypropane (propylene chlorohydrin) and 500 ml. of dimethylformamide is stirred for 3 hours at 120° C. A vigorous stream of $CO_2$ is evolved. Thereafter the mixture is stirred for a further 3 hours at 130° C. The mix is cooled to room temperature, the inorganic material is filtered off, and the substance is isolated by distilling off the dimethylformamide under a waterpump vacuum. 240 g. of a colourless crystal mass (corresponding to 65% of theory) are obtained.

The product can be purified by recrystallisation from acetone. Analyses and spectra show that the product is identical with the preparation manufactured according to Example A(1).

(3) A mixture of 320 g. of the 3-(2'-hydroxy-n-propyl)-5,5-dimethylhydantoin manufactured according to Example A(1) (melting point=86–87° C.), 1281 g. of 5,5-dimethylhydantoin (10 mols) and 20 g. of lithium chloride is stirred at 165° C. to give a clear, homogeneous melt. 640 g. of propene oxide (11 mols) are added dropwise thereto over the course of 70 minutes, with gentle stirring. At the same time the temperature is gradually lowered to 150° C. 10 minutes thereafter, no further propene oxide is detected in the reflux condenser. The reaction is substantially complete; the mixture is allowed to continue reacting for a further 15 minutes at 150° C. Thereafter, traces of easily volatile by-products, and the excess of propene oxide, are stripped off by stirring at 145° C. under 30 mm. Hg. The finished product is then discharged as a melt onto metal sheets, in order to cool.

A pale yellow-coloured product which crystallises slowly is obtained in 100% yield (2.187 kg.); its proton-magnetic resonance spectrum is identical with that recorded from the product manufactured according to Example A(1).

1 kg. of the crude 3-(2'-hydroxy-n-propyl)-5,5-dimethylhydantoin is recrystallised from 1000 ml. of acetone. Without working-up the mother liquor, 798 g. (corresponding to 79.8% of theory) of a colourless crystalline product, melting at 84–86° C., are obtained. The product is pure 3-(2'-hydroxy-n-propyl)-5,5-dimethylhydantoin.

(4) A mixture of 256.2 g. of 5,5-dimethylhydantoin (2 mols) and 3 g. of potassium chloride is stirred at 195° C. 128 g. of propene oxide (2.2 mols) are added dropwise to this melt over the course of 40 minutes. In the course thereof, the reaction temperature drops to 75° C. at a bath temperature of 170° C. Thereafter the temperature is raised to 150° C. over the course of 120 minutes at which time the greatest part of the propene oxide has reacted. The subsequent reaction, and the working-up of the product, take place in accordance with Example A(3). 368.5 g. of 3-(2'-hydroxy-n-propyl)-5,5-dimethylhydantoin crude melt (98.9% of theory) are obtained.

Example B.—Manufacture of 3-(2'-hydroxyethyl)-5,5-dimethylhydantoin

A solution of 529 g. of ethylene oxide (12 mols) in 750 ml. of dimethylformamide is added at 5° C. to a solution of 1281 g. of 5,5-dimethylhydantoin (10 mols) and 20 g. of lithium chloride in 1200 ml. of dimethylformamide. This mixture is warmed to 45–50° C. over the course of one hour. It is stirred for 2 hours at about 50° C.

Thereafter the temperature is further raised to 60° C. for 10 hours. After completion of the reaction the mixture is treated and worked-up as described in Example A(1). 1688 g. of a white crystal mass (corresponding to 98.0% of theory) are obtained.

For purification, the product can be recrystallised from acetone. The purified substance melts at 70–72° C.

Elementary analysis shows (percent): Found: 48.4, C; 7.0, H; 16.1, N. Calculated (percent): 48.8, C; 7.0, H; 16.3, N.

The infra-red spectrum shows the OH absorption at 3390 cm.$^{-1}$, and N—H group absorbs at 3200 cm.$^{-1}$; further important bands are at 1695 and 1770 cm.$^{-1}$ (carbonyl) and at 1047 and 1059 cm.$^{-1}$.

The proton-magnetic resonance spectrum also shows, through agreement of the integral with the number of protons theoretically present, that the new substance has the structure given below:

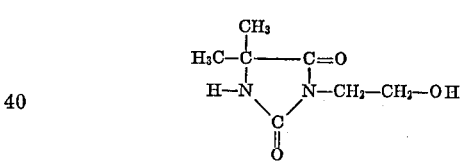

(I) MANUFACTURING EXAMPLES

Example 1

A mixture of 186.2 g. of the 3-(2'-hydroxy-n-propyl)-5,5-dimethylhydantoin manufactured according to Example A(1) (1 mol), 5.0 g. of tetraethylammonium chloride and 925 g. of epichlorohydrin is stirred for one and a half hours at 90° C. 208 g. of 50% strength aqueous sodium hydroxide solution are then added dropwise over the course of two hours at 60° C. and 60–90 mm. Hg, and at the same time the water present in the reaction mixture is continuously removed from the batch by azeotropic circulatory distillation. After the addition of the alkali, the residual water is completely separated off over the course of about 15 minutes; the sodium chloride produced during the reaction is then filtered off. The salt residue is rinsed with 100 ml. of epichlorohydrin. The combined epichlorohydrin solutions are cooled to room temperature and extracted by shaking with 150 ml. of water to remove traces of alkali and salt. After separating off the aqueous phase, the organic layer is concentrated on a rotary evaporator at 60° C. under a waterpump vacuum. Thereafter, the traces of easily volatile constituents are removed at 65° C. under 0.1 mm. Hg.

298.2 g. of a light yellow epoxide resin of low viscosity, containing 6.38 epoxide equivalents per kg. (95.5% of theory) are obtained. The total chlorine content of this N-glycidyl-O-glycidyl compound is 0.8%.

The product can be distilled and boils at 177–178° C. under 0.1 mm. Hg.

The total chlorine content of the distilled product is less than 0.3% of theory. The product contains 26.8% of oxygen (theory 27.7%). The osmometrically determined molecular weight is 292 and the mass spectrum shows a molecular weight of 298 (theory: 298.3). The infra-red spectrum shows that no —OH or —NH absorptions remain present, but on the other hand strong C—O—C absorptions are observed. The H—NMR spectrum also conforms to the following structure:

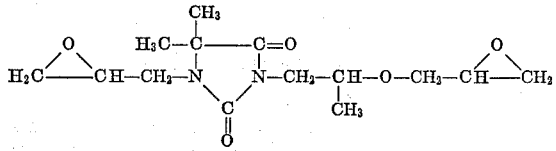

Example 2

344.4 g. of the 3 - (2' - hydroxyethyl)-5,5-dimethylhydantoin manufactured according to Example B (2 mols) are mixed with 9.95 g. of tetraethylammonium chloride and with 3700 g. of epichlorhydrin and stirred for one and a half hours at 90° C.

The dehydrohalogenation is carried out with 416 g. of 50% strength aqueous sodium hydroxide solution, exactly according to Example 1. Working-up also takes place according to Example 1.

568 g. (100% of theory) of a light yellow, clear, transparent resin of low viscosity are obtained, containing 6.77 epoxide equivalents per kg. (96.2% of theory); the total chlorine content is 1.5% of theory.

The infra-red spectrum shows inter alia through the absence of the frequencies for the N—H and O—H vibrations and through the presence of the frequencies for the C—O—C absorption that the reaction has taken place as desired. The new epoxide resin accordingly has the following structure:

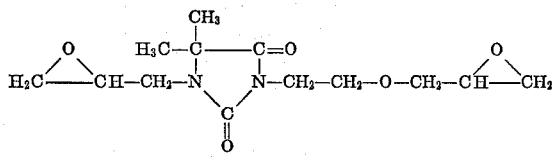

USE EXAMPLES

Example I 107.5 parts of the crude epoxide resin manufactured according to Example 1, containing 6.38 epoxide equivalents per kg., are mixed with 87.7 parts of hexahydrophthalic anhydride at 45° C. to give a light yellow, clear, transparent solution of low viscosity. This mixture is poured into aluminum moulds of 4 mm. wall thickness, prewarmed to 80° C. Curing takes place in 2 hours/80° C. and 3 hours/120° C. and 15 hours/150° C.

The gel time is determined on a 50 g. sample, using the Tecam gelation timer, to be 178 minutes at 80° C.

The test specimens removed from the above moulds show the following properties:

Flexural strength (VSM 77,103) _____kp./mm.$^2$__ 14.40
Deflection (VSM 77,103) _____mm__ 12.3
Tensile strength (DIN 53,455) _____kp./mm.$^2$__ 4.90
Elongation at break (DIN 53,455) ____percent__ 2.2
Heat distortion point according to Martens (DIN
  53,458) _____° C__ 86
Water absorption (4 days/20° C.) ____percent__ 0.58
Dielectric constant, ε at—
  25° C. _____ 3.60
  90° C. _____ 3.70
Dielectric loss factor (tan δ) (50 Hz.) at—
  25° C. _____ 0.0072
  90° C. _____ 0.0050
Specific volume resistance at 25° C. ____Ω·cm__ 9.10$^{16}$

Example II 87.0 parts of the epoxide resin manufactured according to Example 1, containing 6.38 epoxide equivalents per kg., are intimately mixed at room temperature with 13.3 parts of triethylenetetramine and the mixture poured into aluminium moulds of 4 mm. wall thickness and 4 mm. layer thickness. Curing takes place in 24 hours/40° C. and 5 hours/100° C. The pale yellow, clear, transparent moldings thus obtained show the following properties:

Flexural strength (VSM 77,103) _____kp./mm.$^2$__ 13.78
Deflection (VSM 77,103) _____mm__ 14.8
Impact strength (VSM 77,105) ___cm. kp./cm.$^2$__ 16.50

Example III 193.3 parts of the epoxide resin manufactured according to Example 1, containing 6.38 epoxide equivalents per kg., are processed with 159.3 parts of phthalic anhydride at 120° C. to give a homogeneous solution. This solution is poured into aluminium moulds of 4 mm. wall thickness, pre-warmed to 120° C., and cured in 3 hours at 120° C. and in 14 hours at 150° C. The clear, transparent castings thus obtained show the following mechanical and electrical properties:

Flexural strength (VSM 77,103) ___kp./mm.$^2$__ 18.24
Deflection (VSM 77,103) _____mm__ 4.6
Heat distortion point according to Martens 110°
  C. _____(DIN 53,458)
Water absorption (4 days/20° C.) ___percent__ 0.73
Tensile strength (DIN 53,455) _____kp./mm.$^2$__ 8.10
Elongation at break (DIN 53,455) ___percent__ 2.6
Tracking resistance (VDE), level _____ KA 3c
Breakdown voltage (instantaneous value) kv./
  cm. _____ 195
Dielectric constant, ε at 110° C. _____ 3.70
Dielectric loss factor, tan δ (50 Hz.) at—
  25° C. _____ 0.005
  100° C. _____ 0.0095
Specific volume resistance at 23° C. ____Ω.cm__ 3.5.10$^{16}$

Example IV 147.5 parts of the 1-glycidyl-3-(2-glycidyloxy-ethyl)-5,5-dimethylhydantoin manufactured according to Example 2, having an epoxide content of 6.77 equivalents per kg., are mixed with 131.5 parts of hexahydrophthalic anhydride at 50° C. and this mixture is poured into the aluminium moulds described above. The mixture is cured in 2 hours/80° and in 14 hours/140° C. Clear, transparent mouldings having the following properties are obtained:

Fluexural strength (VSM) _____kp./mm.$^2$__ 16.0
Deflection (VSM) _____mm__ 10.2
Impact strength (VSM) _____cm. kp./cm.$^2$__ 23.5
Heat distortion point according to Martens (DIN)
  °C__ 105

Example V 161.3 parts of a technical epoxide resin manufactured analogously to Example 1, containing 6.20 epoxide equivalents/kg., are cured with 144.98 parts of hexahydrophthalic anhydride and 9 parts of an accelerator mixture of 5% of 1-methylimidazole and 95% of a solution of 0.82% of sodium metal in 2,4-dihydroxy-3-hydroxymethylpentane, in accordance with Example I, in 4 hours at 80° C. and 16 hours at 140° C. The mouldings thus obtained show the following properties:

Fluexural strength (VSM 77,103) _____kp./mm.$^2$__ 16.5
Deflection (VSM 77,103) _____mm__ 10.0
Impact strength (VSM 77,105) ____cm. kp./cm.$^2$__ 28.0
Heat distortion point according to Martens (DIN)
  ° C__ 98
Water absorption (4 days/20° C.) _____percent__ 0.4

Example VI 100 parts of the epoxide resin used in Example V are intensively mixed with 95 parts of hexahydrophthalic anhydride and 6 parts of the accelerator mixture described in Example V and 400 parts of quartz powder, and cured in 16 hours at 140° C. Mouldings are obtained which notwithstanding a very high proportion of filler, namely 66.6%, give excellent mechanical values. The mouldings have the following properties:

Fluexural strength (VSM 77,103) _____kp./cm.² __ 13
Deflection (VSM 77,103) _____mm__ 1.5
Impact strength (VSM 77.105) ____cm. kp./cm.² __ 7.0
Heat distortion point according to Martens (DIN) ° C __ 115
Water absorption (4 days/20° C.) _____percent__ 0.1

We claim:
1. A diglycidyl compound of formula

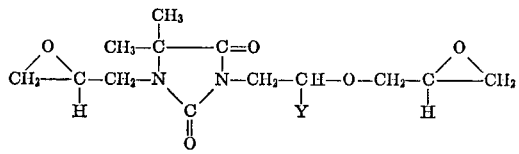

wherein Y represents a member selected from the group consisting of a hydrogen atom and a methyl group.

2. A compound as claimed in claim 1 which is 1-glycidyl-3-(2'-glycidyloxyethyl)-5,5-dimethyl-hydantoin.

3. A compound as claimed in claim 1 which is 1-glycidyl-3-(2'-glycidyloxy-n-propyl)-5,5-dimethyl-hydantoin.

References Cited
UNITED STATES PATENTS
3,449,353    6/1969    Porret et al. _____ 260—309.5
3,629,263   12/1971    Batzer et al. _____ 260—309.5

HENRY R. JILES, Primary Examiner
S. D. WINTERS, Assistant Examiner

U.S. Cl. X.R.
260—2 EP, 2 EA, 2 N